(12) United States Patent
Fischer et al.

(10) Patent No.: US 8,794,429 B2
(45) Date of Patent: Aug. 5, 2014

(54) PAN SECTION

(75) Inventors: Frank Fischer, Lunen (DE); Siegfried Schmidt, Bottrop (DE); Eugen Baier, Kamen (DE); Jörg Wirtz, Witten (DE); Uwe Tillessen, Kamen (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 344 days.

(21) Appl. No.: 13/128,535

(22) PCT Filed: Nov. 3, 2009

(86) PCT No.: PCT/IB2009/054875
§ 371 (c)(1),
(2), (4) Date: Jun. 1, 2011

(87) PCT Pub. No.: WO2010/055440
PCT Pub. Date: May 20, 2010

(65) Prior Publication Data
US 2011/0220466 A1 Sep. 15, 2011

(30) Foreign Application Priority Data

Nov. 11, 2008 (DE) ...................... 20 2008 014 952 U

(51) Int. Cl.
*B65G 21/00* (2006.01)
(52) U.S. Cl.
USPC ............... 198/735.3; 198/735.2; 198/725; 198/728; 198/860.1; 198/860.2
(58) Field of Classification Search
USPC ............ 198/735.3, 735.2, 725, 728, 860.1, 198/860.2
See application file for complete search history.

(56) References Cited

U.S. PATENT DOCUMENTS

| 3,788,458 | A | * | 1/1974 | Braun et al. | 198/735.2 |
|---|---|---|---|---|---|
| 3,791,511 | A | * | 2/1974 | Holland | 198/728 |
| 3,944,061 | A | * | 3/1976 | Braun et al. | 198/735.2 |
| 4,269,304 | A | * | 5/1981 | Braun et al. | 198/735.1 |
| 4,301,913 | A | * | 11/1981 | Braun et al. | 198/735.2 |
| 4,359,154 | A | * | 11/1982 | Temme | 198/735.2 |
| 4,467,914 | A | * | 8/1984 | Trammel et al. | 198/860.2 |
| 4,883,322 | A | * | 11/1989 | Blumenthal et al. | 198/735.3 |
| 4,982,556 | A | * | 1/1991 | Tisma | 53/506 |
| 5,131,724 | A | | 7/1992 | Bandy, Jr. et al. | |

(Continued)

FOREIGN PATENT DOCUMENTS

| DE | 3905324 A1 | 8/1990 |
|---|---|---|
| DE | 4005249 A1 | 9/1991 |

(Continued)

*Primary Examiner* — Leslie A Nicholson, III
(74) *Attorney, Agent, or Firm* — Foley & Lardner LLP

(57) ABSTRACT

A pan section for combined conveying and winning apparatuses having a bottom run and a top run for guiding driver elements of a conveyor chain, as well as a welded frame structure which has two side cheeks which consist of one-piece rolled profiles. The rolled profiles have a constant profile shape with a bottom leg and a top leg, which are angled outwards in the assembled state, and an intermediate leg being provided with an offset for supporting and welding at least one intermediate plate. The pan section further includes a substructure connected to the bottom leg of the rolled profiles to connect both bottom legs to one another at a distance from the intermediate bottom. The substructure also has mounting pieces positioned at the ends below the bottom legs for transverse-force transmission means.

25 Claims, 3 Drawing Sheets

(56) References Cited

U.S. PATENT DOCUMENTS

| | | | |
|---|---|---|---|
| 5,700,061 A * | 12/1997 | Merten et al. | 299/43 |
| 6,896,121 B2 | 5/2005 | Vorsteher et al. | |
| 7,188,441 B2 | 3/2007 | Merten et al. | |
| 7,213,699 B2 * | 5/2007 | Adams | 198/735.2 |
| 7,641,286 B2 | 1/2010 | Siepenkort et al. | |
| 2003/0213677 A1 * | 11/2003 | Vorsteher et al. | 198/735.2 |
| 2003/0213678 A1 * | 11/2003 | Vorsteher et al. | 198/735.2 |
| 2004/0026216 A1 * | 2/2004 | Vorsteher et al. | 198/735.2 |
| 2004/0256907 A1 * | 12/2004 | Merten et al. | 299/34.04 |
| 2009/0066147 A1 | 3/2009 | Tout et al. | |

FOREIGN PATENT DOCUMENTS

| | | |
|---|---|---|
| DE | 10222599 C1 | 10/2003 |
| DE | 20315759 U1 | 12/2003 |
| DE | 20307150 U1 | 7/2004 |
| DE | 202005004383 U1 | 5/2005 |
| EP | 0525926 A1 | 2/1993 |
| EP | 1362805 B1 | 8/2005 |
| FR | 1009452 A | 5/1952 |
| GB | 727357 | 3/1955 |
| GB | 2109763 A | 6/1983 |
| GB | 2131761 A | 6/1984 |
| GB | 2228244 A | 8/1990 |

* cited by examiner

PAN SECTION

The invention relates to a pan section for combined conveying and winning apparatuses in particular for underground mining, comprising a bottom run and a top run for guiding the driver elements of a conveyor chain, comprising a welded frame structure which has two side cheeks which consist of one-piece rolled profiles arranged in mirror image and having a constant profile shape from one end to the other end, said profile shape comprising a bottom leg and a top leg, which are angled outwards in the assembled state, and a rising intermediate leg which connects said bottom leg and top leg and which is provided with an offset, on which at least one step for supporting and welding at least one intermediate plate stiffening the rolled profiles in the frame structure is formed on the inside, and comprising mounting pockets for detachable pan-section connecting means which are welded on the outside to the rolled profile between top leg and bottom leg close to both ends.

BACKGROUND OF THE INVENTION

Scraper chain conveyors having large overall lengths are used in underground winning installations, such as in underground mining operations for example, these scraper chain conveyors being composed of individual pan sections which are connected to one another in a manner resistant to tension on the end side. The adjacent pan sections attached to one another are connected in particular via toggle pockets and toggles as pan-section connecting means which allow certain angular mobility of the adjacent pan sections in the horizontal and vertical so that the scraper chain conveyor can compensate for ground unevenness in the floor and can be moved along with the advance of the working face. If the pan sections are used for longwall face conveyors, they are provided with attachments on the goaf side and/or on the working-face side for guiding, for example, a winning plough or a shearer loader and have connecting brackets for an advancing beam buttressed at the face support. Improvements in the production output of the winning machines and increasing the face lengths up to 450 m in the meantime likewise increase the conveying output that the conveyors have to cope with, and modern face and gate conveyors must be able to cope with conveying capacities of at least 2000 t/h (metric tons/hour) and even 5000 t/h in the case of high-output conveyors. With increasing conveying capacity, the wear of individual pan sections inevitably increases and there is a need on the market for conveyor pans having a high conveying capacity and a long service life at the lowest possible production costs and low overall weight of the individual pan sections.

Modern underground face and gate conveyors can be divided into three groups with reference to the construction of the pan sections. The first group contains conveyors having completely cast pan sections. The advantage of such cast structures lies in their high reproducibility, in the high loading capacity on account of the homogeneous construction and in the low susceptibility to assembly errors. Disadvantages are the high material costs, the fact that individual zones cannot be easily designed for higher loads or longer service life and the fact that there is no possibility of exchanging wearing parts.

The second group forms "hybrid pans" which consist of cast parts on the one hand and of rolled parts on the other hand. EP 525 926 A1, for example, shows such a hybrid pan. Hybrid pans only need a small number of welds since, for example, the entire structure of the side cheek including side profile for guiding the scrapers in the runs of the conveyor and toggle pockets as part of the pan-section connecting means can be designed in one piece, whereas the conveyor bottom, as one of the highly loaded parts, is welded to the cast side cheeks.

Furthermore, it is known in the case of hybrid pans to subsequently weld on the pan-section connecting means and other attachments for shifting the conveyor or for guiding a winning machine (DE 39 05 324 A1).

The third group of pan sections consists entirely or more or less entirely of a welded structure and the invention proceeds from the structure which is known from EP 1 362 805 B1 and in which at least the side cheeks consist of rolled profiles having a profile shape which is asymmetrical over the height and which has an offset with step between a bottom leg and a top leg, to which offset an intermediate bottom connecting the rolled profiles virtually rigidly is welded. The offset results in an especially advantageous profile shape which makes it easier to weld on functional parts and attachments and reduces the requisite assembly steps for producing a pan section as a welded structure. The frame structure is stiffened centrally. An overlap of the pan section with the mounting pockets for toggles at one pan section and a set-back arrangement of mounting pockets at the other pan section are said to protect the rolled profiles and the conveyor bottom or the intermediate bottom from fatigue fractures.

SUMMARY OF THE INVENTION

It is an object of the invention to provide a pan section which offers all the advantages of a welded structure and is in particular suitable for use in shearer loader operations for working seams having workable thicknesses of preferably more than 5 m.

This object and others is achieved in a pan section of the type in question in that a substructure is provided which is connected to the bottom leg of the rolled profiles, connects both bottom legs to one another at a distance from the intermediate bottom and has mounting pieces positioned at the ends below the bottom legs for transverse-force transmission means. Since shearer loaders whose dead weight can exceed 120 t are used in shearer loader operations for working seam thicknesses greater than, for example, 5 m, the individual pan sections are subjected to considerable forces in operational use, and these forces may lead to increased wear in particular at the intermediate bottom and at the conveyor bottom of the top run, but also at bottom elements of the bottom run, on account of relative movements of adjacent pan sections. Due to the arrangement according to the invention of transverse-force transmission means in a substructure below the bottom legs, the forces occurring in operational use transversely to the conveying direction can be transmitted at a distance from the conveyor base and intermediate base, and, due to the positioning of these means below the rolled profiles in a substructure, there are also no restrictions for the dimensioning of the transverse-force transmission means. At the same time, the substructure provides for additional stiffening of the two rolled profiles relative to one another, such that the central components of each pan section, namely the side cheeks consisting of rolled profiles, can also maintain a larger distance apart than was hitherto normally the case, as a result of which, with wider and possibly also deeper drivers, the conveying output of a conveyor formed with the pan sections according to the invention can be increased in turn.

In an especially preferred configuration, the transverse-force transmission means is formed by apertures and pegs, which interact in the assembled state and can be releasably fitted one inside the other, at the end faces of the pan section ends. For assembly and production reasons, it is especially advantageous if the mounting pieces at one end of the pan section have only pegs and the mounting pieces at the other end of a pan section have only apertures for the engagement of the pegs of a further pan section. Each mounting piece at one pan section end advantageously has precisely one peg and the associated mounting piece at the other pan section end advantageously has precisely one matching aperture for this peg so that, in a conveyor, in each case a peg projects or an aperture for the engagement of the peg is provided at a respective pan section end below both rolled profiles. A respective transverse-force transmission means is therefore assigned to each rolled profile or each side cheek and consequently there are two transverse-force transmission means per pan section end.

In order to simplify manufacture, the pegs may consist in particular of pins which have a pin shank, which can be fixedly welded in an aperture or in the aperture in the mounting piece, and a pin head projecting at the end face beyond the mounting pieces in the assembled state. In this configuration, all the mounting pieces can therefore consist of an identically designed basic element having an aperture, wherein some of the mounting pieces are provided with a welded-in pin as peg in order to provide with the same basic part a male part and a female part for the transverse-force transmission means. Since adjacent pan sections in operational use must have a certain angular mobility relative to one another, the pin head, in this configuration, can advantageously be provided with a crowned lateral surface and/or the pin shank merges via a circumferential constriction into the pin head. The crowned lateral surface allows sufficient angular mobility and ensures low pressure forces in the contact zones between aperture and pin head. The constriction provides for the requisite clearance space if adjacent pan sections bear against one another with minimum spacing and are at the same time disposed at an angle to one another. The circumferential constriction at the same time provides for sufficient requisite motional play for the angling both vertically and horizontally, i.e. in the horizontal direction. The mounting pieces for use with pegs can advantageously consist of narrow strips or blocks having an aperture open to the rear side of the mounting pieces, as a result of which the pegs can be fastened or are fastened in the apertures via a welded joint applied from the rear side of the mounting pieces. The female part and the male part of the transverse-force transmission means therefore differ from one another only in the sense that a pin is either inserted as peg in the aperture or is not inserted.

In the simplest configuration, the mounting pieces may consist of cut-off and machined blocks, but may also consist of forged parts or cast parts. To optimize the overall weight of the pan sections, it is advantageous if two separate mounting pieces are arranged at each end of the pan section, wherein the mounting pieces, four in all, are then preferably connected via a single, continuous bottom plate of sufficient plate thickness. The bottom plate then stiffens the mounting pieces to form a substructure resistant to bending, as a result of which the frame structure of rolled profiles and intermediate bottom is additionally stiffened in turn. To simplify assembly and improve the connection, the bottom plate can in this case be provided with marginal cutouts for pre-positioning and fastening the mounting pieces. According to an especially preferred configuration, the bottom plate projects outwards with a plate strip at least beyond the bottom leg of one of the two rolled profiles in order to form a machine track for a winning machine, in particular a shearer loader, with this plate strip projecting in front of the rolled profile. Since the machine track is integrally formed on the bottom plate, an additional weld is dispensed with, while at the same time the bending resistance of the pan section is increased. Furthermore, the bottom plate can also preferably project beyond the bottom leg of the opposite rolled profile with a continuous plate strip or with plate strip sections for fastening attachment elements such as attachment brackets for shifting beams, stiffening plates for supporting a rack arrangement for a shearer loader, spill plates or the like. In operational use, the machine track usually faces the mineral to be worked on the working-face side, whereas the attachment elements are arranged on the goaf side.

In order to minimize the plate thickness of the bottom plates, it is especially advantageous if stiffening ribs are integrally formed or are preferably welded under the bottom plate. In this case, the stiffening ribs may be arranged to run transversely and longitudinally and may also be arranged crosswise in order to achieve, with the lowest possible weight of the material of bottom plate and reinforcing ribs, an optimum bending resistance of the substructure extending substantially over the entire depth of the pan section.

According to an especially preferred configuration, the mounting strips have on their top side an integrally formed groove which serves to accommodate, center and support the bottom leg and to which the bottom leg is welded. In this configuration, the mounting pieces consist in particular of cast parts having an integrally formed groove. Not only can the bottom leg then be provided with slight lateral support by the groove walls, but the groove on the top side of the mounting pieces also enables the weld between bottom leg and mounting piece to be applied at a distance above the machine track. The outer surfaces, pointing outwards, of the groove flanks can in particular run with a curvature, and the groove depth is preferably greater that the thickness of the bottom leg so that the bottom leg and the fastening weld lie in a sunk position and protected by the groove flanks inside the groove. The mounting pieces preferably extend on both sides of the bottom legs of the rolled profiles in order to permit advantageous support of the rolled profiles, forming the side cheeks, on the floor. The mounting pieces, on the top side of the section extending inwards, may have a fastening slope for bearing strips for the vertical support of the driver elements of the scraper chain in the bottom run. The bearing strips may in particular consist of narrow sheet-metal strips which are arranged obliquely to the intermediate bottom in the assembled state and on which the driver elements returning in the bottom run rest. The bottom plate can then at the same time form a base for the bottom run, and the bearing strips, as elements coming into contact with the drivers in the bottom run, can be exchanged if need be. It is especially advantageous if the transverse-force transmission means are positioned below the fastening slopes and such as to be shifted inwards relative to the bottom legs. Due to this measure, the transverse-force transmission means then lie further to the inside than the pan-section connecting means for accommodating the toggles or the like, with which pan sections lying next to one another are connected in a manner resistant to tension.

The intermediate leg section of the rolled profiles may in particular have a top intermediate leg section above the offset and a bottom intermediate leg section, shifted inwards relative to said top intermediate leg section, below the offset, wherein the bottom intermediate leg section of the rolled profile, below the step, can form with its inner side at least partly the side walls of the bottom run and/or the top intermediate leg section, above the step and offset, defines with its inner side a receptacle for an interchangeable trough as top run. The use of an interchangeable trough as top run has the advantage that the interchangeable trough, which is generally subjected to the greatest loading and becomes worn quickest, can be exchanged and at the same time the remaining pan section can be used again. As in the prior art of the type in question, the interchangeable trough can be fastened via a welded joint or else via other connecting means.

In the pan sections according to the invention, the bottom intermediate leg section can preferably run obliquely outwards at an angle. This configuration can ensure that neither the top intermediate leg section nor the bottom intermediate leg section comes into contact with the driver elements in operational use. The rolled profiles can then perform solely a stiffening function for the side cheeks and provide a means of connecting further attachments. Furthermore, the rolled profile, in the region of the offset, may be provided with a material accumulation reinforcing the step and/or can may have the narrowest wall thickness immediately above the offset, as a result of which the profile shape of the rolled profiles is adapted to the loads that occur.

The profile shape of the rolled profiles is preferably selected in such a way that the bottom leg and the top leg lie vertically offset one above the other and end approximately on a vertical line at their leg ends angled outwards. For the preferred use of the pan section according to the invention in shearer loader operations, a side plate can be provided which is fastened on the goaf side and to which holders for a shearer loader rack are fastened and/or to which spill plates for laterally raising the top run on the goaf side are fastened.

Further advantages and configurations of a pan section according to the invention follow from the description below of a preferred exemplary embodiment shown in the drawing.

Further, these and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF EMBODIMENTS

Figure 1:
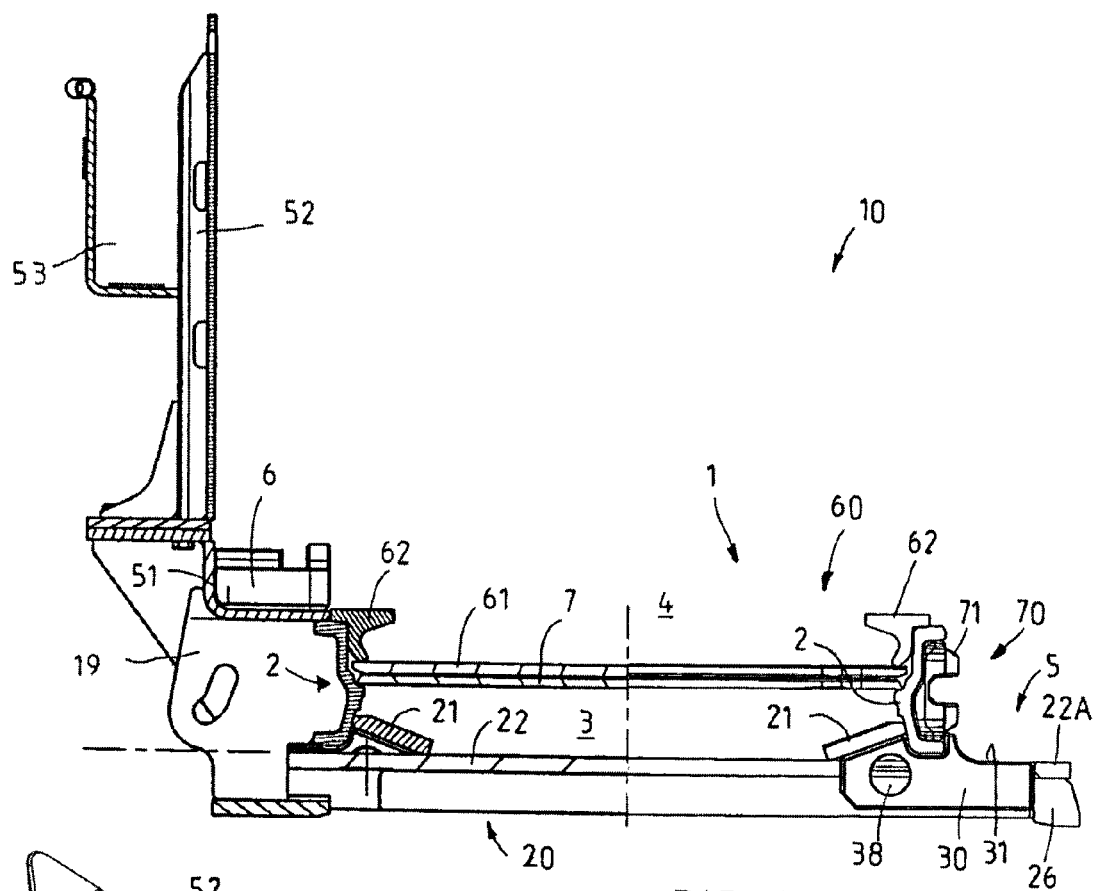
FIG. 1 shows a pan section according to the invention in side view, partly truncated.
Figure 2:
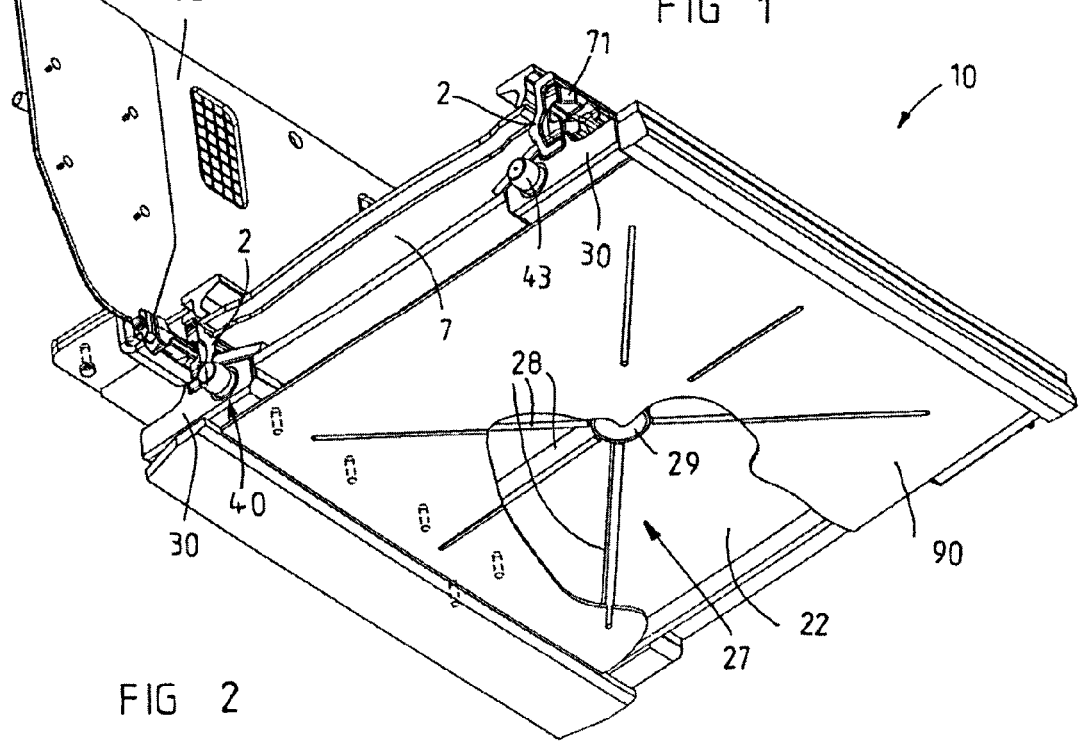
FIG. 2 shows the pan section from FIG. 1 in a perspective view from below.

Referring now to the drawings wherein the showings are for the purpose of illustrating preferred and alternative embodiments of the invention only and not for the purpose of limiting same, designated overall by reference numeral 10 in FIGS. 1 and 2 is a pan section according to the invention for a combined conveying and winning apparatus for underground mining, in particular for the mining of coal. The pan section 10 has a welded frame structure 1 which defines a bottom run 3 and a top run 4 of a conveying apparatus by means of two side cheeks consisting of rolled profiles 2. A conveyor can be formed using a multiplicity of identically constructed pan sections connected to one another via pan-section connecting means 70, and driver elements (not shown), such as in particular scrapers of a scraper chain (likewise not shown), circulate in the bottom run 3 and top run 4 of said conveyor in order to transport coal and other materials away from the face. The top run 4 of the pan section 10 forms the conveying run in which material, such as preferably coal, won by means of a winning apparatus (not shown) is discharged from the face and transferred to a gate conveyor. The bottom run 3 serves as a return run for the scraper chain, in which return run no material is transported, as is known per se to the person skilled in the art for underground conveying and winning apparatuses.

In the exemplary embodiment shown, the pan section 10 is designed for use in a shearer loader operation, and the pan section 10 has a machine track 5 for guiding a shearer loader (not shown) on the working-face side, i.e. on the right-hand side in FIGS. 1 and 2, and connecting brackets 6 for a rack (not shown here) on the goaf side of the bottom run 3 and top run 4. The pan section 10 according to the invention is designed for use in a shearer loader operation in which the shearer loader can simultaneously work a seam thickness of more than 5 m during each pass. Accordingly, the scraper chain in the top run 4 must also be able to remove material won at this thickness. Shearer loaders for such seam thicknesses can have dead weights of more than 120 t, for which reason the pan section 10 is designed for reliably absorbing such dead weights and constructed according to the invention.

A central design element of the pan section 10 is formed by the side cheeks consisting of rolled profiles 2, wherein the two rolled profiles 2, as can readily be seen from FIG. 1, are arranged in mirror image to one another and are rigidly connected to one another in such a way as to resist bending on the one hand via an intermediate bottom 7 and on the other hand via a substructure designated overall by reference numeral 20. The rolled profiles 2 forming the side cheeks essentially have the construction as described in EP 1 362 805 B1, to the disclosure of which reference is additionally made for complementing the present disclosure. The profile shape of the rolled profiles 2 is explained below with reference to FIG. 5. The rolled profiles 2 have a profile shape which is asymmetrical over the height but is constant over the length of a pan section 10. Each rolled profile 2 has a profile shape having a bottom leg 11 and a top leg 12 which are each angled outwards in the assembled state with respect to the bottom run 3 and the top run 4, respectively, and between which an intermediate leg 13 rising vertically as viewed overall extends. Via an approximately centrally arranged offset 14 already integrally formed during the rolling, the intermediate leg 13 is subdivided into a top, vertically running intermediate leg section 15 above the offset 14 and a bottom intermediate leg section 16 which, in the exemplary embodiment shown of a rolled profile 2 according to the invention, runs outwards and downwards, starting from the offset 14, at an oblique angle of, in this case, approximately 15° relative to the vertical. The bottom leg 11 integrally formed on the bottom intermediate leg section 16 and angled outwards and the top leg 12 integrally formed on the top intermediate leg section 15 and angled outwards in turn each run at an angle of approximately 90° to the vertical, i.e. substantially horizontally here. The size of the offset 14 and the size of the oblique angle of the bottom intermediate leg section 16 are selected in such a way that, in the assembled state, the bottom leg 11 and the top leg 12 in principle have the same length, lie one above the other and end in the same vertical planes. The offset 14 forms a material accumulation, on the top side of which a step 17 is produced, on which the intermediate bottom 7 rests and to which the intermediate bottom 7 is welded by means of a longitudinal weld, which can also be applied mechanically. As shown in FIG. 1, the side cheeks opposite one another in mirror image are connected to one another virtually rigidly by the intermediate bottom 7 in order to give the frame structure 1 sufficient stiffness in the centre plane. The central elements of the frame structure 1 therefore consist primarily of only three parts, namely the two rolled profiles 2 and the intermediate bottom 7, which can be connected to one another via two longitudinal welds.

Figure 5:
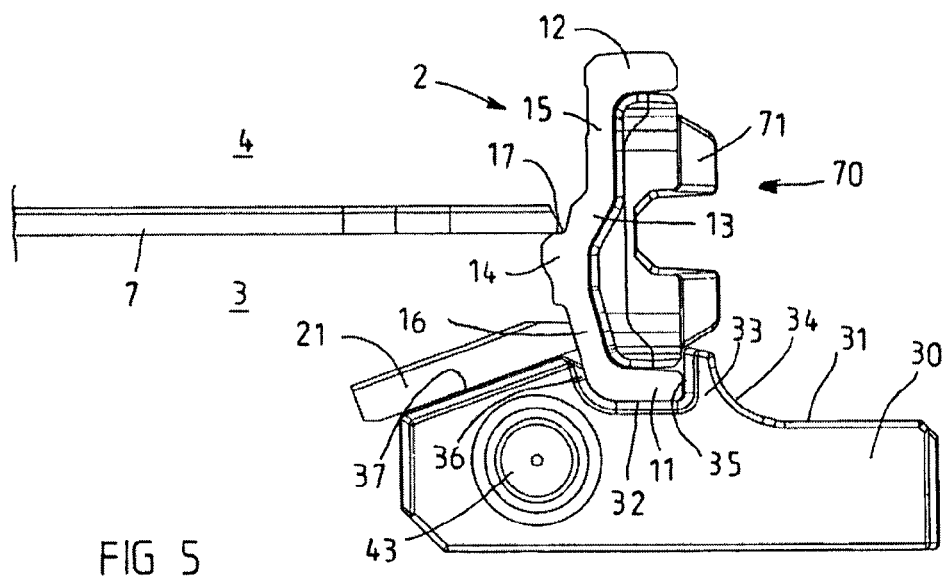
FIG. 5 shows a side view of one half of the structure from FIG. 3.
Figure 6:
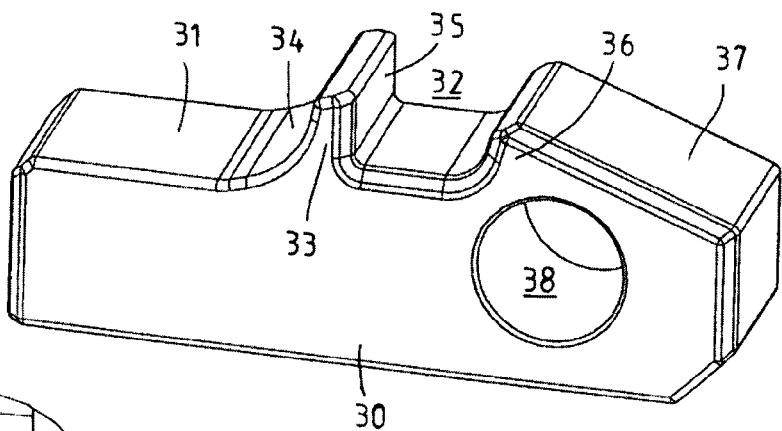
FIG. 6 shows, in a perspective view, a mounting piece for a pan section according to the invention.

As shown especially clearly by FIGS. 3 and 5, a respective narrow, block-shaped mounting piece 30 preferably consisting of a cast part is welded to the ends of each pan section below the bottom leg 11, said mounting piece 30 extending on both sides of the bottom leg 11 and supporting the bottom leg 11 and therefore also the rolled profile 2 towards the top. FIG. 6 shows the mounting piece 30 in detail for use in the pan sections according to the invention. In order to obtain a favorable welded joint between the bottom leg 11 and the mounting pieces 30, the mounting pieces 30 have on the top side 31 a groove 32, the width of which is adapted to the width of the bottom leg 11. The groove 32, already integrally formed here during the casting of the mounting pieces 30, has an external groove flank 33 which rises higher than the bottom leg 11 and is provided on the outside with a curvature 34. A weld for fixedly welding the bottom leg 11 in the groove 32 can be made on the inner side 35, here running vertically, of the outer groove flank 33 and therefore in a region which is protected with respect to the outer sections of the mounting pieces 30. A second weld for fastening the bottom leg 11 to the mounting pieces 30 can be applied to the transition of the internal groove flank 36, the inner side of which runs slightly angled in accordance with the inclination of the bottom intermediate leg section 16 and then merges into an obliquely running, upwardly pointing fastening slope 37 on the mounting piece 30.

Figure 3:
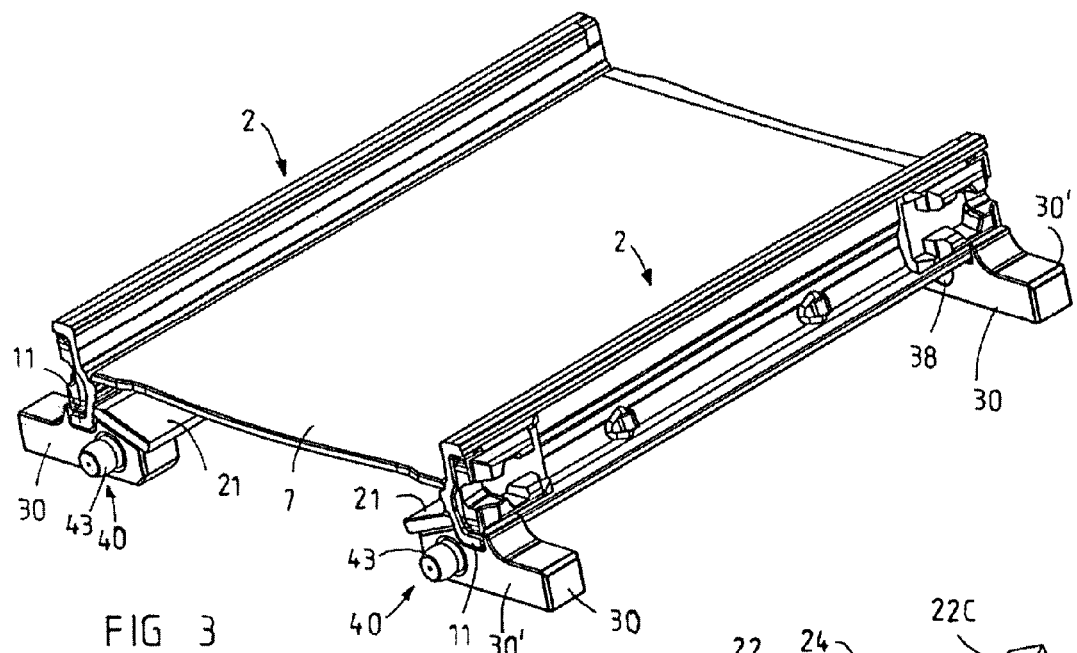
FIG. 3 shows the frame structure of a pan section according to the invention, without substructure.

In the exemplary embodiment shown, all four mounting pieces 30, as can readily be seen from FIG. 3, consist of identical blocks and each of these mounting pieces 30 is provided with a circular, continuous aperture 38 closed at the periphery. The apertures 38 in the mounting pieces 30 serve as or for the provision of transverse-force transmission means, with which high forces can also be transmitted transversely to the conveying direction between adjacent pan sections in a winning installation.

Figure 7:
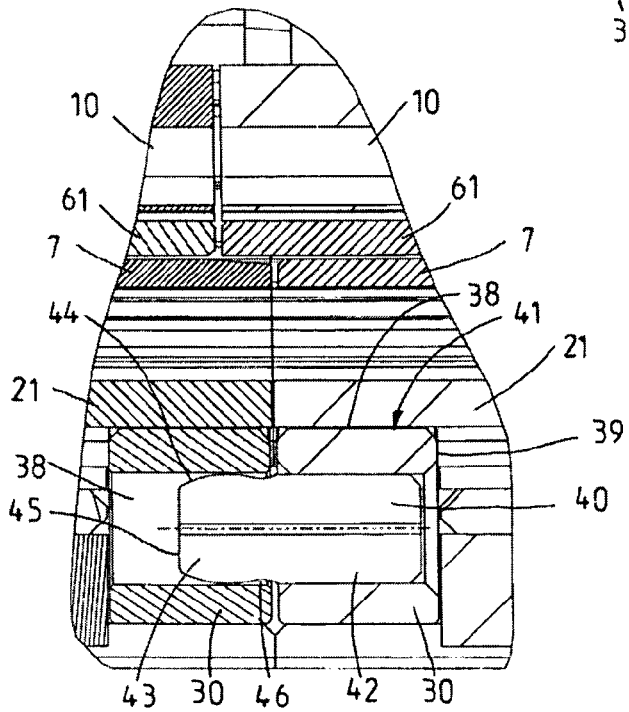
FIG. 7 shows a detailed sectional view of two pan sections connected to one another at the pan abutment and having transverse-force transmission means engaging one inside the other.

The transverse-force transmission means formed with the mounting pieces 30 comprise, on the one hand, a female part having an aperture 38 in the mounting pieces 30 and, on the other hand, a male part having a partly projecting peg 40. As shown by FIGS. 1, 2 and 3, the mounting pieces 30 (male part) provided with the peg 40 are arranged on the one side of the pan section 10, whereas the mounting pieces 30 (female part) having only the aperture 38 are arranged on the rear end in FIG. 3. The alternate arrangement of mounting pieces 30 as female part or male part below the bottom leg can readily be seen in FIGS. 1 to 3. In the assembled state of two adjacent pan sections 10, the pegs 40 on the one mounting piece 30 (male part) and the aperture on the other mounting piece (female part) of the following pan section 10 now engage one inside the other, as illustrated in FIG. 7. As a result, transverse forces, which are produced in particular when a shearer loader is travelling past, can be transmitted via the pegs 40 and relative movements can thus be prevented in a positive-locking manner. The pegs 40 consist of sturdy pins 41 having a round pin shank 42 and a pin head 43. The diameter of the pin shank 42 is adapted for being inserted with a transition fit or an interference fit into the aperture 38 in a mounting piece 30. Since the aperture 38 is designed as a through-hole, the pin shank 42 can be reliably anchored in the one set of mounting pieces 30 from the rear side 39 of the mounting pieces 30 via a weld (not shown here). The pin shank 42 has substantially the same length as the depth of the mounting pieces 30. The pin head 43, on the other hand, is shorter and has only about 60% of the length of the pin shank 42 here. It therefore projects by approximately less than ⅔ into the aperture 38 in the following mounting piece 30. As FIG. 7 readily shows, the pin head 43 has a crowned lateral surface 44 which tapers in the axial direction of the pin 41 towards the free pin head end 45. Formed between the pin shank 42 and the pin head 43 is a constriction 46, which ensures good angular mobility exactly in the abutment region between two abutting pan sections 10, in which the mounting pieces 30, as shown in FIG. 7, can abut against one another with minimum gap clearance. Due to the crowned shape of the pin heads 43, the pin head 43 can swivel, in the aperture 38 of the mounting piece 30 on the left-hand side in FIG. 7, in both the vertical direction and the horizontal direction in order to ensure the angular mobility of abutting pan sections 10 to a sufficient extent. At the same time, the pin head 43 plunging into the aperture 38 fixes two adjacent pan sections in the transverse direction in a positive-locking manner, since for this loading the maximum diameter of the lateral surface 44 of the pin head sits only with slight clearance in the aperture 38.

Reference is now again made to FIGS. 3 and 5, from which it can be seen that the four mounting pieces 30 are each welded to the respective ends of the rolled profiles 2 in such a way below the bottom legs 11 thereof that the end face of the rolled profile 2 and the end face 30' of the mounting pieces 30 terminate approximately flush. As can readily be seen from FIG. 3, the pin head 43 of the transverse-force transmission means projects beyond the end face 30' only at one pan section end. Bearing strips 21 are put onto the obliquely angled fastening slopes 37, pointing upwards, of the mounting pieces 30 and welded in place, and these bearing strips 21 form a guide for the scrapers returning in the bottom run 3 and come into contact directly with a back, running at a corresponding angle, of the scrapers as driver elements. The bearing strips can preferably consist of wear-resistant wearing plates which extend over the entire length of a pan section and which are welded, for example via individual welds, inter alia to the mounting pieces 30 in order to be able to be exchanged during repair or maintenance of a pan section. Support of the bearing strips 21 only at the mounting pieces 30 in the end zones of each pan section can be sufficient, since in the bottom run the scrapers bear only with their dead weight against the bearing strips 21, without transporting material. It can clearly be seen from FIG. 5 that each bottom run 3 is defined in the marginal region by the bearing strips 21, by the intermediate bottom 7 and by the offset of the bottom intermediate leg section 16.

Figure 4:
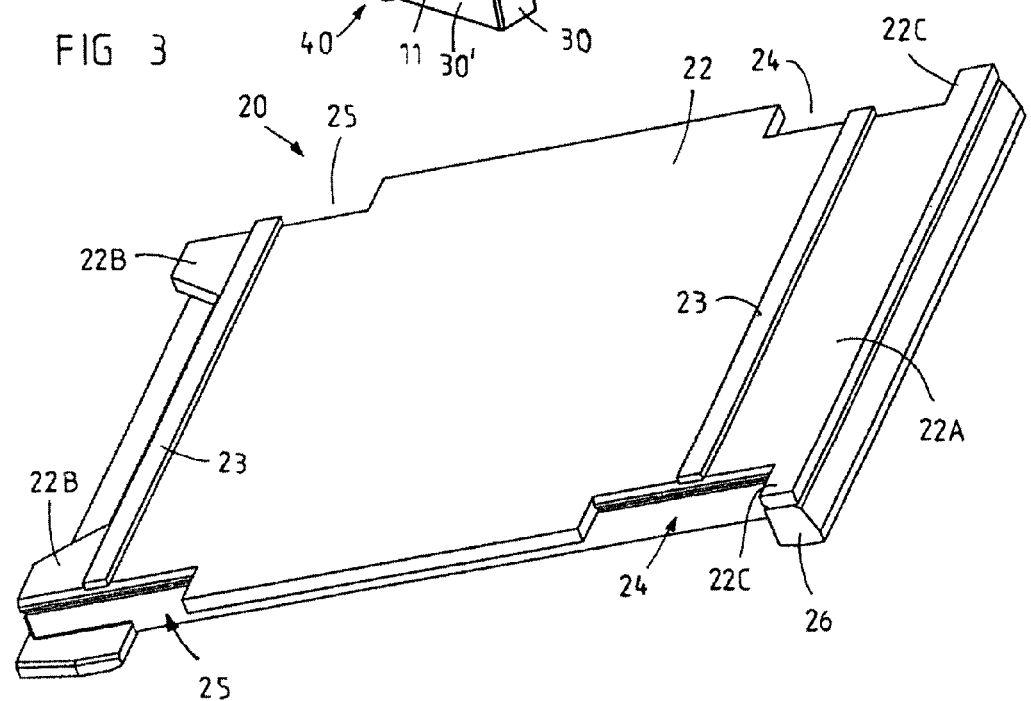
FIG. 4 shows, in a perspective view, the substructure of a pan section according to the invention, without mounting pieces.

In order to increase the bending resistance of the two rolled profiles 2 forming the side cheeks, the entire frame structure 1 is additionally stiffened with a substructure 20, which is shown in detail in FIG. 4, although with omitted mounting pieces there as an integral part of the substructure 20. The substructure 20 comprises a one-piece bottom plate 22 which extends over the entire width and length of a pan section 10 and, in the preferred configuration, projects on both sides in the assembled state beyond the bottom legs of the rolled profiles 2. For bearing or for welding on the bottom legs of the rolled profiles 2, two weld-on strips 23 are placed on the bottom plate 22 and fastened thereto, the strips 23 being arranged approximately centrally with respect to marginal cutouts 24 and 25, respectively, which are each formed on the lateral end edges of the bottom plate 22 and serve to pre-position and weld on the mounting pieces in the marginal cutouts 24, 25. In the assembled state, the bottom leg bears between the grooves (32, FIG. 5) in the mounting pieces 30 directly on the bearing strips 23. The bottom plate 22 projects with a continuous plate strip 22A to the right in FIG. 4 and with two outer plate sections 22B on the left-hand side in FIG. 4 beyond the strip 23 there. The continuous plate strip 22A forms, in the pan section (10, FIG. 1), a machine track (5, FIG. 1) on the working-face side, and welded on below this plate strip 22A is a sturdy scraping beam 26, with which a pan section in operational use rests directly on the "floor". At the front ends of the pan section 10, the plate strip 22A projects with a narrow web 22C laterally beyond the right-hand cutout 24 in FIG. 4 so that a continuous machine track is produced which is formed only partly in the region of the cutouts 24 by the top sides 31, substantially flat there, of the mounting pieces 30 and is otherwise formed exclusively by the plate strip 22A.

The plate strip sections 22B lie in operational use on the goaf side, and stiffening plates or transverse ribs 19 can be welded to them in order to be able to fasten a, for example angular, side plate 51 to the frame structure 1, as shown by FIGS. 1 and 2, to the top side of which side plate 51 the brackets 6 for the rack of the shearer loader can be fastened and on which side plate 51 an attachable spill plate 52 rising upwards can also preferably be screwed in place via further aids. In the exemplary embodiment shown, a trailing-cable duct 53 for the trailing supply cable for the shearer loader is fastened to the rear side of the attachable spill plate 52.

The top run 4, in which the won material is removed by the conveyor chain, preferably consists of an interchangeable trough 60 which can be inserted in the frame structure 1 in an interchangeable manner and can be fastened there either via screwed connections, clamped connections or welded joints. In a manner known per se, the interchangeable trough 60 has a conveyor bottom 61 and two side profiles 62 which are welded to said conveyor bottom 61 and the inner profile of which is adapted to the configuration of the driver elements of the scraper chain. In a known manner, the provision of an interchangeable trough 60 ensures that the service life of a pan section 10 can again be prolonged by exchanging an interchangeable trough.

Toggle pockets 71 are fastened, in particular welded, to the outer sides of the rolled profiles 2, close to the ends and here substantially flush with the end faces of the mounting pieces, in which toggle pockets 71 toggles (not shown) can be inserted in order to provide, with the toggle pockets 71 and the toggles, pan-section connecting means with which adjacent pan sections can be anchored in a manner resistant to tension. The toggle pockets 71 are preferably inserted in a matching manner between bottom leg 11 and top leg and also bear against the outer side of the intermediate leg 13, as FIG. 5 shows.

In the exemplary embodiment shown, the substructure 20 comprises not only a bottom plate 22, continuous over the width, for additionally stiffening the two rolled profiles 2 but also a rib structure 27 with stiffening ribs 28 on the underside of the bottom plate 22, which here extend radially from a central weld-on ring 29 in the centre of the bottom plate 22 towards the edges and end faces of the bottom plate 22 in order to give the bottom plate 22 as high a bending resistance as possible in all directions. The substructure can be stiffened with further longitudinal or transverse struts. A further bottom plate 90 can be welded as bottom end plate below the rib structure. As a result, the rib structure 27 can be arranged in a space that is closed to a very large extent.

In the assembled state, the end edges of the bearing strips 21, as can again be seen from FIG. 7, bear almost flush against one another. The intermediate bottoms 7 of two adjacent pan sections, at any rate in the sectional plane shown, also bear flush against one another. The conveyor bottoms 61 of the interchangeable troughs can project slightly on the one side in the same plane and can be set back on the other side in order to also provide a certain overlap here, with which fines are prevented from passing through at the abutting edge between two pan sections.

For the person skilled in the art, numerous modifications which are to come within the scope of protection of the patent claims emerge from the above description. The dimensioning of the transverse-force transmission means can, depending on the requirement profile, turn out to be different. The use of identical mounting pieces has economic advantages. The mounting pieces could in principle also consist of blocks or narrow strips or forged parts, even though cast parts are advantageous for forming the groove and additional support of the bottom legs.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A pan section for combined conveying and winning apparatuses in particular for underground mining, the pan section comprising a bottom run and a top run for guiding driver elements of a conveyor chain, the pan section further comprising a welded frame structure which includes two oppositely facing side cheeks each formed by a one-piece rolled profile and the each profile having a constant profile shape from one end to the other end, the each profile shape comprising a bottom leg and a top leg, which are angled outward in the assembled state, and a rising intermediate leg which connects the bottom leg and the top leg and which is provided with an offset formed on an inside surface which includes at least one step for supporting and welding at least one intermediate plate stiffening the rolled profiles in the frame structure, the each profile further comprising mounting pockets for detachable pan-section connectors which are welded on the outside of the each profile between the top leg and the bottom leg close to both ends, the pan section further including a substructure connected to the bottom legs of the rolled profiles which connects both bottom legs to one another and the substructure being spaced from the at least one intermediate plate, the pan section further including mounting pieces positioned at the both ends of the profiles below the bottom legs and extend on both sides of the bottom legs, the mounting pieces, on a top side of the pan section extending inwards, each having a fastening slope for bearing strips for the vertical support of the driver elements in the bottom run, and a transverse-force transmission having apertures disposed below the fastening slopes and inward of the bottom legs.

2. The pan section according to claim 1, wherein the transverse-force transmission comprises apertures and corresponding pegs.

3. The pan section according to claim 2, wherein the mounting pieces at one end of the pan section have the corresponding pegs and the mounting pieces at the other end of the pan section have the apertures for the engagement of the corresponding pegs of an adjacent pan section.

4. The pan section according to claim 2, wherein the corresponding pegs are pins which have a pin shank, which can be fixedly welded in the aperture in the mounting pieces, and a pin head projecting beyond the mounting pieces in the assembled state.

5. The pan section according to claim 4, wherein the pin head comprises a crowned lateral surface and the pin shank comprises a circumferential constriction portion adjacent the pin head.

6. The pan section according to claim 2, wherein the mounting pieces are formed by narrow blocks having the apertures open to the rear side of the mounting pieces, wherein the corresponding pegs are fastened in the apertures via a welded joint applied from the rear side of the mounting pieces.

7. The pan section according to claim 1, wherein the mounting pieces comprise two mounting pieces arranged at each end of the pan section, and the four mounting pieces being connected via a bottom plate.

8. The pan section according to claim 7, wherein the bottom plate is provided with marginal cutouts for pre-positioning and fastening the mounting pieces.

9. The pan section according to claim 7, wherein the bottom plate projects outwards with a plate strip beyond the bottom leg of one of the rolled profiles and forms a machine track with the plate strip.

10. The pan section according to claim 9, wherein the bottom plate projects beyond the bottom leg of the other rolled profile with at least one plate strip section for fastening attachment elements.

11. The pan section according to claim 7, wherein stiffening ribs are integrally joined to the bottom plate.

12. The pan section according to claim 1, wherein the mounting pieces have on their top side an integrally formed groove which accommodates the bottom leg and to which the bottom leg is welded.

13. The pan section according to claim 12, wherein at least one of the groove depths of the grooves is greater than the thickness of the bottom leg and an outer wall of external groove flanks is formed with a curvature.

14. The pan section according to claim 1, wherein the intermediate leg has a top intermediate leg section above the offset and a bottom intermediate leg section, the bottom intermediate leg section being shifted inwards relative to the top intermediate leg section below the offset wherein the top intermediate leg section, above the step and the offset, defines with its inner side a receptacle for an interchangeable trough for the top run.

15. The pan section according to claim 14, wherein the bottom intermediate leg section runs obliquely outwards at an angle.

16. The pan section according to claim 1, wherein at least one of the each profile, in the region of the offset, is provided with at least one of a thickened portion reinforcing the step and a narrow portion immediately above the offset.

17. The pan section according to claim 1, wherein the bottom leg and the top leg lie vertically offset one above the other and end approximately on a vertical line.

18. The pan section according to claim 1, further including a side plate which is fastened on the goaf side of the pan section and which includes at least one of holders for a shearer loader rack and spill plates for laterally raising the top run on the goaf side.

19. The pan section according to claim 1, wherein the mounting pockets are welded without abutment overlap to the rolled profiles between the bottom leg and the top leg.

20. A pan section for underground mining, comprising:
a bottom run and a top run for guiding driver elements of a conveyor chain;
a frame structure having two oppositely facing side cheeks each comprising a bottom leg and a top leg;
a substructure connected to the bottom legs which connects both bottom legs to one another; and
mounting pieces positioned at both ends of the side cheeks below the bottom legs and extending on both sides of the bottom legs, the mounting pieces, on a top side of the pan section extending inwards, each having a fastening slope for bearing strips for the support of the driver elements in the bottom run, and a transverse-force transmission comprising an aperture disposed in a first pair of the mounting pieces below the fastening slopes and inward of the bottom legs, and a corresponding peg disposed on a second pair of the mounting pieces, so that the apertures in one pan section are engageable with the corresponding pegs in an adjacent pan section.

21. The pan section according to claim 20, wherein the mounting pieces are formed by narrow blocks having the apertures open to a rear side of the mounting pieces, wherein the corresponding pegs are fastened in the apertures via a welded joint applied from the rear side of the mounting pieces.

22. The pan section according to claim 20, wherein the first pair of mounting pieces and the second pair of mounting pieces are arranged at each end of the pan section, and the four mounting pieces are connected via a bottom plate.

23. The pan section according to claim 22, wherein the bottom plate is provided with marginal cutouts for pre-positioning and fastening the mounting pieces.

24. The pan section according to claim 22, wherein the bottom plate projects outwards with a plate strip beyond one of the bottom legs and forms a machine track with the plate strip.

25. A method of making a pan section for use in underground mining, the pan section having a bottom run and a top run for guiding driver elements of a conveyor chain, the method comprising:
providing a frame structure having two oppositely facing side cheeks each comprising a bottom leg and a top leg;
coupling a substructure to the bottom legs which connects both bottom legs to one another; and
coupling a mounting piece at both ends of the each of the side cheeks below the bottom legs, the mounting pieces, on a top side of the pan section extending inwards, each extending on both sides of the bottom legs and having a fastening slope for support of the driver elements in the bottom run, and a transverse-force transmission comprising an aperture disposed in a first pair of the mounting pieces below the fastening slopes and inward of the bottom legs, and a corresponding peg disposed on a second pair of the mounting pieces, so that the apertures in one pan section are engageable with the corresponding pegs in an adjacent pan section.

* * * * *

UNITED STATES PATENT AND TRADEMARK OFFICE
CERTIFICATE OF CORRECTION

| | | |
|---|---|---|
| PATENT NO. | : 8,794,429 B2 | Page 1 of 1 |
| APPLICATION NO. | : 13/128535 | |
| DATED | : August 5, 2014 | |
| INVENTOR(S) | : Fischer et al. | |

It is certified that error appears in the above-identified patent and that said Letters Patent is hereby corrected as shown below:

In the Specification

Column 7, line 66, delete "aperture" and insert -- aperture 38 --.

Column 8, line 49, delete "strips" and insert -- strips 21 --.

Column 9, line 10, delete "pieces" and insert -- pieces 30 --.

Column 9, line 60, delete "leg" and insert -- leg 12 --. (2nd occurrence)

Signed and Sealed this
Fifteenth Day of September, 2015

Michelle K. Lee
*Director of the United States Patent and Trademark Office*